US009753322B2

(12) United States Patent
Yoshimoto et al.

(10) Patent No.: US 9,753,322 B2
(45) Date of Patent: Sep. 5, 2017

(54) LIQUID CRYSTAL DISPLAY AND METHOD OF MANUFACTURING THE SAME

(71) Applicant: SAMSUNG DISPLAY CO., LTD., Yongin, Gyeonggi-do (KR)

(72) Inventors: Hiroshi Yoshimoto, Seoul (KR); Sakae Tanaka, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 85 days.

(21) Appl. No.: 14/642,946

(22) Filed: Mar. 10, 2015

(65) Prior Publication Data

US 2015/0378226 A1    Dec. 31, 2015

(30) Foreign Application Priority Data

Jun. 30, 2014  (KR) .................. 10-2014-0080927

(51) Int. Cl.
| | | |
|---|---|---|
| *G02F 1/1339* | (2006.01) | |
| *G02F 1/1335* | (2006.01) | |
| *G02F 1/1343* | (2006.01) | |
| *G02F 1/1362* | (2006.01) | |

(52) U.S. Cl.
CPC .... *G02F 1/133514* (2013.01); *G02F 1/13394* (2013.01); *G02F 1/134309* (2013.01); *G02F 2001/13396* (2013.01); *G02F 2001/13398* (2013.01); *G02F 2001/134372* (2013.01); *G02F 2001/136218* (2013.01)

(58) Field of Classification Search
CPC ........... G02F 1/136286; G02F 1/13394; G02F 1/1368; G02F 1/136209; G02F 1/133514; G02F 2001/13398; G02F 2001/13396; G02F 2001/136218; H01L 27/1262; H01L 27/1288; H01L 27/124
USPC .................................. 349/106, 141, 155, 156
See application file for complete search history.

(56) References Cited

U.S. PATENT DOCUMENTS

| | | | | |
|---|---|---|---|---|
| 2005/0110928 A1* | 5/2005 | Sonoda | ............ | G02F 1/133555 349/114 |
| 2007/0216842 A1* | 9/2007 | Kawasaki | ............ | G02F 1/1368 349/141 |
| 2007/0273819 A1* | 11/2007 | Kawasaki | ......... | G02F 1/134363 349/141 |

(Continued)

FOREIGN PATENT DOCUMENTS

| | | |
|---|---|---|
| JP | 2004-341465 | 12/2004 |
| JP | 2008-090191 | 4/2008 |

(Continued)

*Primary Examiner* — Hoan C Nguyen
(74) *Attorney, Agent, or Firm* — F. Chau & Associates, LLC

(57) ABSTRACT

A liquid crystal display is provided. The liquid crystal display includes a first substrate, a second substrate facing the first substrate and a liquid crystal layer interposed between the first and second substrates. The first substrate includes a first base substrate, a bump protruded from the first base substrate and an electrode having a shield electrode part and a common electrode part. The shield electrode part covers the bump. The second substrate includes a second base substrate and a spacer protruded toward the bump of the first substrate. A combined structure of the spacer and the bump supports the first and second substrates.

13 Claims, 19 Drawing Sheets

(56) References Cited

U.S. PATENT DOCUMENTS

| | | | | |
|---|---|---|---|---|
| 2009/0268131 A1* | 10/2009 | Tsai | ................... | G02F 1/13338 349/106 |
| 2010/0245699 A1* | 9/2010 | Gotoh | ................ | H01L 27/1288 349/46 |
| 2011/0058137 A1 | 3/2011 | Huang et al. | | |
| 2012/0257156 A1* | 10/2012 | Hiratsuka | ......... | G02F 1/134363 349/143 |
| 2014/0293199 A1* | 10/2014 | Sakae | ............... | G02F 1/134363 349/106 |

FOREIGN PATENT DOCUMENTS

| | | |
|---|---|---|
| JP | 2012-118199 | 6/2012 |
| KR | 1020060001425 | 1/2006 |
| KR | 1020070002421 | 1/2007 |
| KR | 1020070079677 | 8/2007 |
| KR | 1020130013952 | 2/2013 |

\* cited by examiner

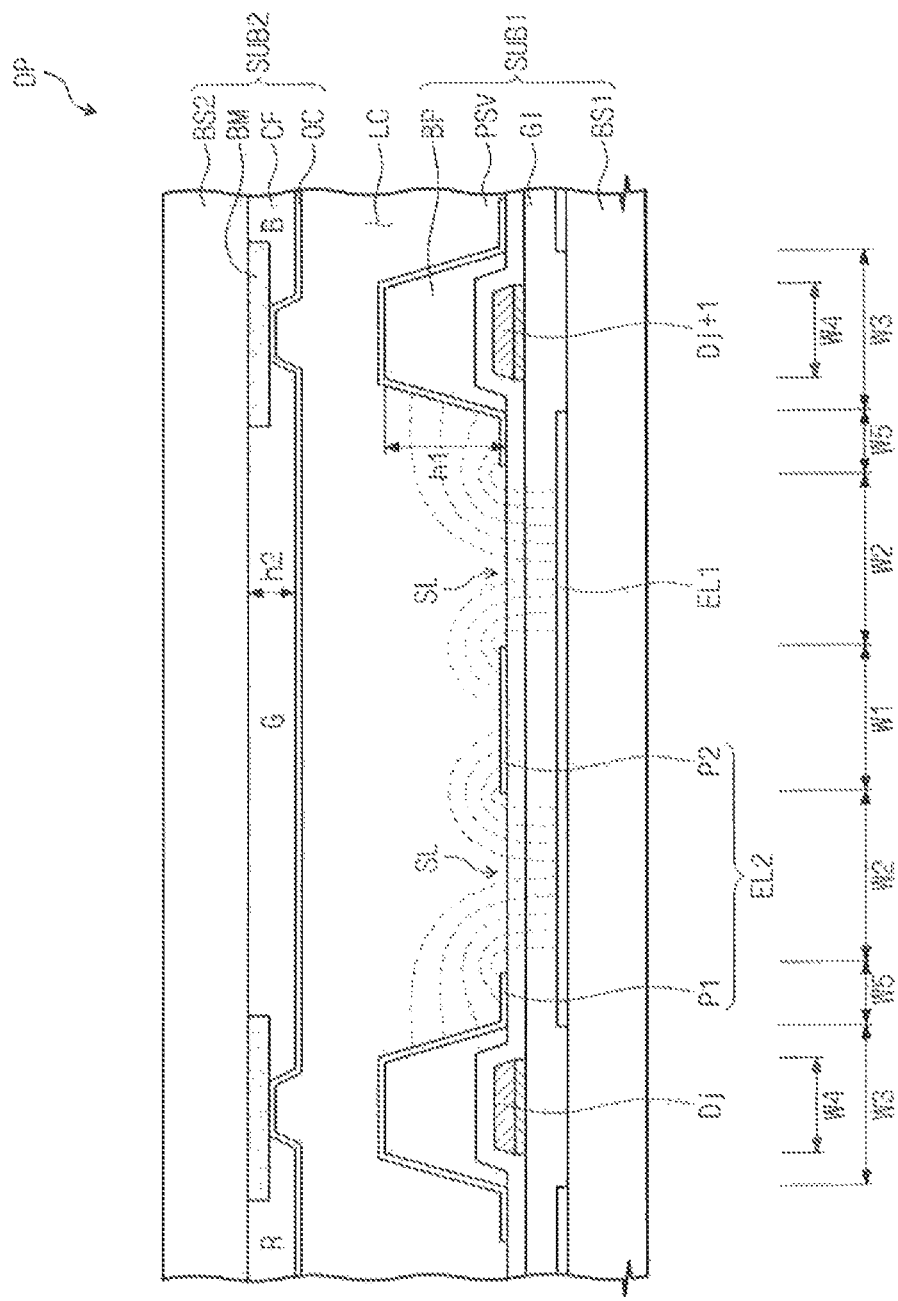

LIQUID CRYSTAL DISPLAY AND METHOD OF MANUFACTURING THE SAME

CROSS-REFERENCE TO RELATED APPLICATION

This application claims priority under 35 U.S.C. §119 to Korean Patent Application No. 10-2014-0080927, filed on Jun. 30, 2014 in the Korean Intellectual Property Office, the disclosure of which is incorporated by reference herein in its entirety.

TECHNICAL FIELD

The present invention relates to a liquid crystal display and a method of manufacturing the same.

DISCUSSION OF RELATED ART

Liquid crystal displays display an image using a liquid crystal layer. The liquid crystal displays are classified into lateral electric field mode liquid crystal displays and vertical electric field mode liquid crystal displays according to a driving method of the liquid crystal layer thereof. The lateral electric field mode liquid crystal displays form a lateral electric field between two electrodes to drive the liquid crystal layer and the vertical electric field mode liquid crystal displays form a vertical electric field between two electrodes to drive the liquid crystal layer.

The vertical electric field mode liquid crystal displays include the two electrodes disposed on two substrates, respectively. The lateral electric field mode liquid crystal displays include the two electrodes disposed on one of the two substrates. A transmittance of light of the liquid crystal displays may be determined by controlling alignment orientation of liquid crystal molecules of the liquid crystal layer.

SUMMARY

According to an exemplary embodiment of the present invention, a liquid crystal display is provided. The liquid crystal display includes a first substrate, a second substrate facing the first substrate and a liquid crystal layer interposed between the first and second substrates. The first substrate includes a first base substrate, a first electrode disposed on the first base substrate, a bump protruded from the first base substrate and a second electrode including a shield electrode part and a common electrode part. The shield electrode part covers the bump. The common electrode part is disposed at a center of the first electrode. The second electrode is insulated from the first electrode and overlapped with the first electrode. The second substrate includes a second base substrate, a color filter layer including a plurality of color pixels disposed on the second base substrate, and a spacer protruded toward the bump of the first substrate. The spacer comprises a same material as at least one of the plurality of color pixels. A combined structure of the spacer and the bump is configured to support the first and second substrates.

According to an exemplary embodiment of the present invention, a method of manufacturing a liquid crystal display is provided. A first substrate is formed. A second substrate is formed. A liquid crystal layer is formed between the first and second substrate. The forming of the first substrate includes forming of a first electrode on a first base substrate, forming of an insulating layer on the first electrode, forming of a bump on the first base substrate, and forming of a second electrode including a shield electrode part and a common electrode part on the first base substrate. The shield electrode part covers the bump. The common electrode part is disposed at a center of the first electrode. The forming of the second substrate includes forming of a color filter layer on a second base substrate and forming of a spacer protruded from the second base substrate. The color filter layer includes a plurality of color pixels. At least one of the plurality of color pixels and the spacer are formed in a single process.

BRIEF DESCRIPTION OF THE DRAWINGS

These and other features of the present invention will become more apparent by describing in detail exemplary embodiments thereof with reference to the accompanying drawings of which:

FIG. 4A is a cross-sectional view taken along line I-I' shown in FIGS. 3A and 3B;

DETAILED DESCRIPTION OF EXEMPLARY EMBODIMENTS

Figure 1:
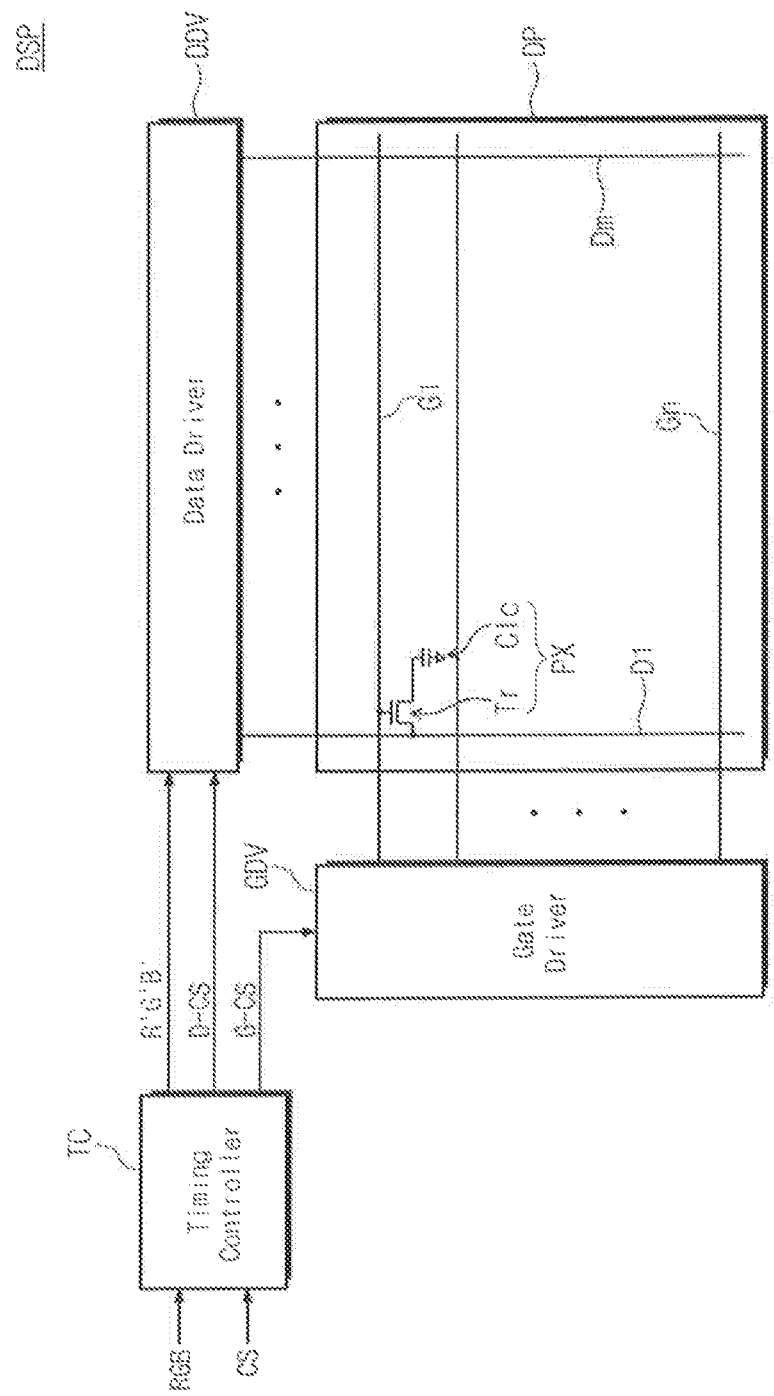
FIG. 1 is a block diagram showing a liquid crystal display according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Hereinafter, the present invention will be described with reference to the accompanying drawings.

Figure 2:
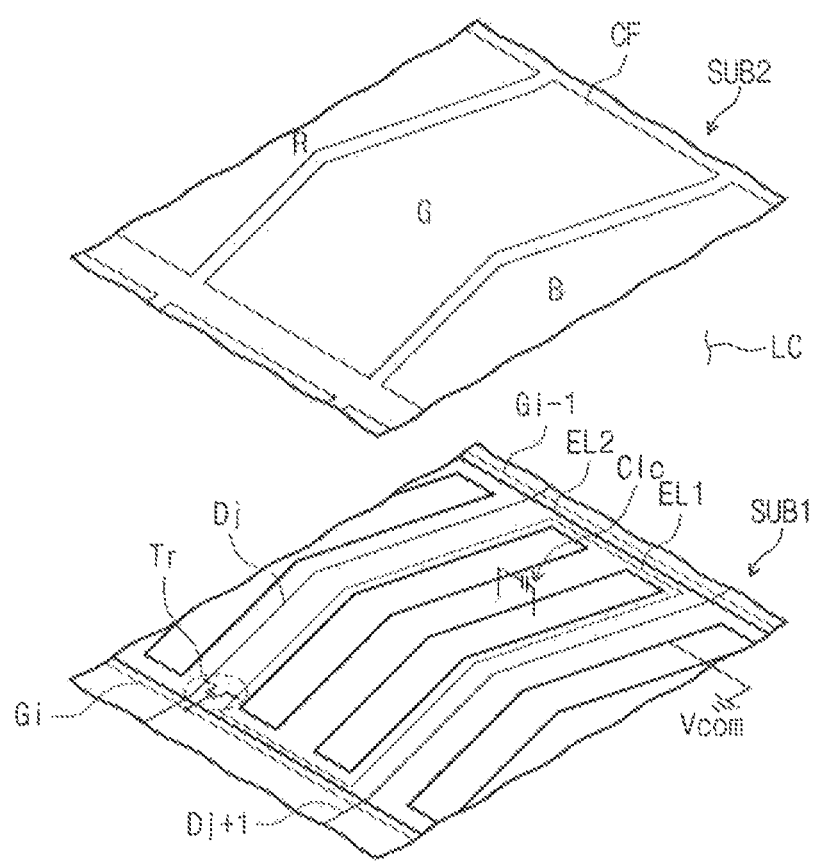
FIG. 2 is an equivalent circuit diagram showing a pixel shown in FIG. 1.

FIG. 1 is a block diagram showing a liquid crystal display according to an exemplary embodiment of the present invention, and FIG. 2 is an equivalent circuit diagram showing a pixel shown in FIG. 1.

Referring to FIG. 1, a liquid crystal display DSP includes an image display part DP to display an image, gate and data drivers GDV and DDV to drive the image display part DP, and a timing controller TC to control the gate and data drivers GDV and DDV.

The image display part DP includes a plurality of gate lines G1 to Gn, a plurality of data lines D1 to Dm, and a plurality of pixels PX. As shown in FIG. 2, the image display part DP includes a liquid crystal display panel configured to include a first substrate SUB1, a second substrate SUB2 facing the first substrate SUB1, and a liquid crystal layer LC interposed between the first substrate SUB1 and the second substrate SUB2.

The gate lines G1 to Gn and the data lines D1 to Dm are disposed on the first substrate SUB1. The gate lines G1 to Gn, extending in a row direction, are arranged in a column direction to be substantially in parallel to each other. The data lines D1 to Dm, extending in the column direction, are arranged in the row direction substantially in parallel to each other.

Each of the pixels, for instance, a pixel connected to an i-th gate line Gi ("i" is an integer number equal to or larger than 1) and a j-th data line Dj ("j" is an integer number equal to or larger than 1) includes a thin film transistor Tr and a liquid crystal capacitor Clc.

The thin film transistor Tr includes a gate electrode connected to the i-th gate line Gi, a source electrode connected to the j-th data line Dj, and a drain electrode connected to the liquid crystal capacitor Clc.

The liquid crystal capacitor Clc includes a first electrode EL1 disposed on the first substrate SUB1 and a second electrode EL2 disposed on the second substrate SUB2 as its two terminals and the liquid crystal layer LC serves as a dielectric material. The first electrode EL1 is electrically connected to the drain electrode of the thin film transistor Tr, and the second electrode EL2 receives a reference voltage Vcom.

Each pixel PX further includes a color filter CF disposed on the second substrate SUB2, facing toward the first electrode EL1. The color filter CF displays one of primary colors.

The timing controller TC receives a plurality of image signals RGB and a plurality of control signals CS from an external source (not shown) of the liquid crystal display DSP. The timing controller TC serves to convert a data format of the image signals RGB to a data format for the data driver DDV. The converted image signals R'G'B' of the timing controller TC is provided to the data driver DDV. The timing controller TC generates a data control signal D-CS, e.g., an output start signal, a horizontal start signal, etc., and a gate control signal G-CS, e.g., a vertical start signal, a vertical clock signal, a vertical clock bar signal, etc., on the basis of the control signals CS. The data control signal D-CS is applied to the data driver DDV and the gate control signal G-CS is applied to the gate driver GDV.

The gate driver GDV sequentially outputs gate signals in response to the gate control signal G-CS provided from the timing controller TC. Accordingly, the pixels PX are sequentially scanned by the gate signals in the unit of row.

The data driver DDV converts the image signals R'G'B' to data voltages in response to the data control signal D-CS provided from the timing controller TC. The data voltages are applied to the image display part DP.

Therefore, each pixel PX is turned on in response to a corresponding gate signal of the gate signals, and the turned-on pixel PX receives a corresponding data voltage of the data voltages from the data driver DDV, thereby displaying a desired image.

Figure 3A:
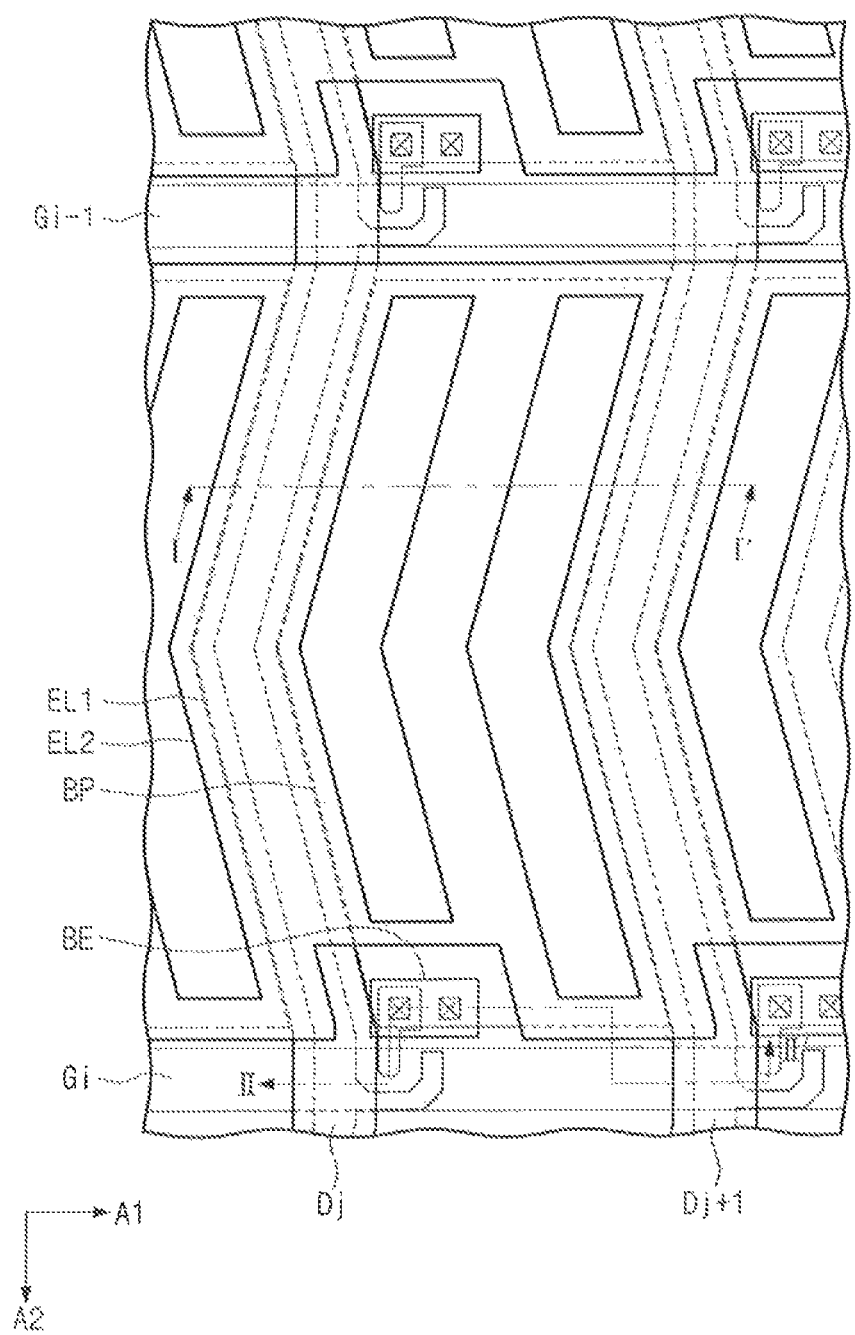
FIG. 3A is a plan view showing a first substrate of a liquid crystal display panel according to an exemplary embodiment of the present invention.
Figure 3B:
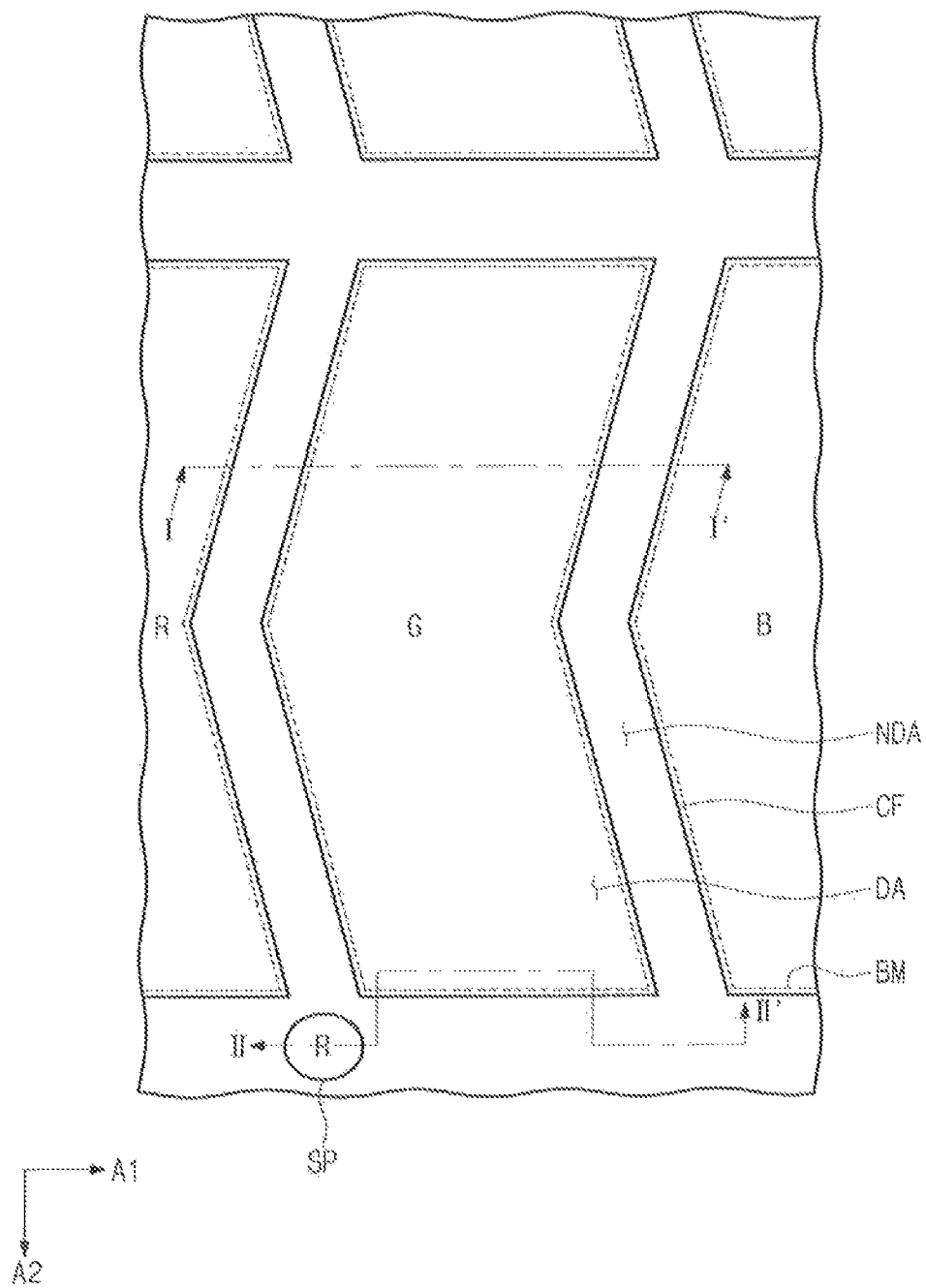
FIG. 3B is a plan view showing a second substrate of a liquid crystal display panel according to an exemplary embodiment of the present invention.
Figure 4B:
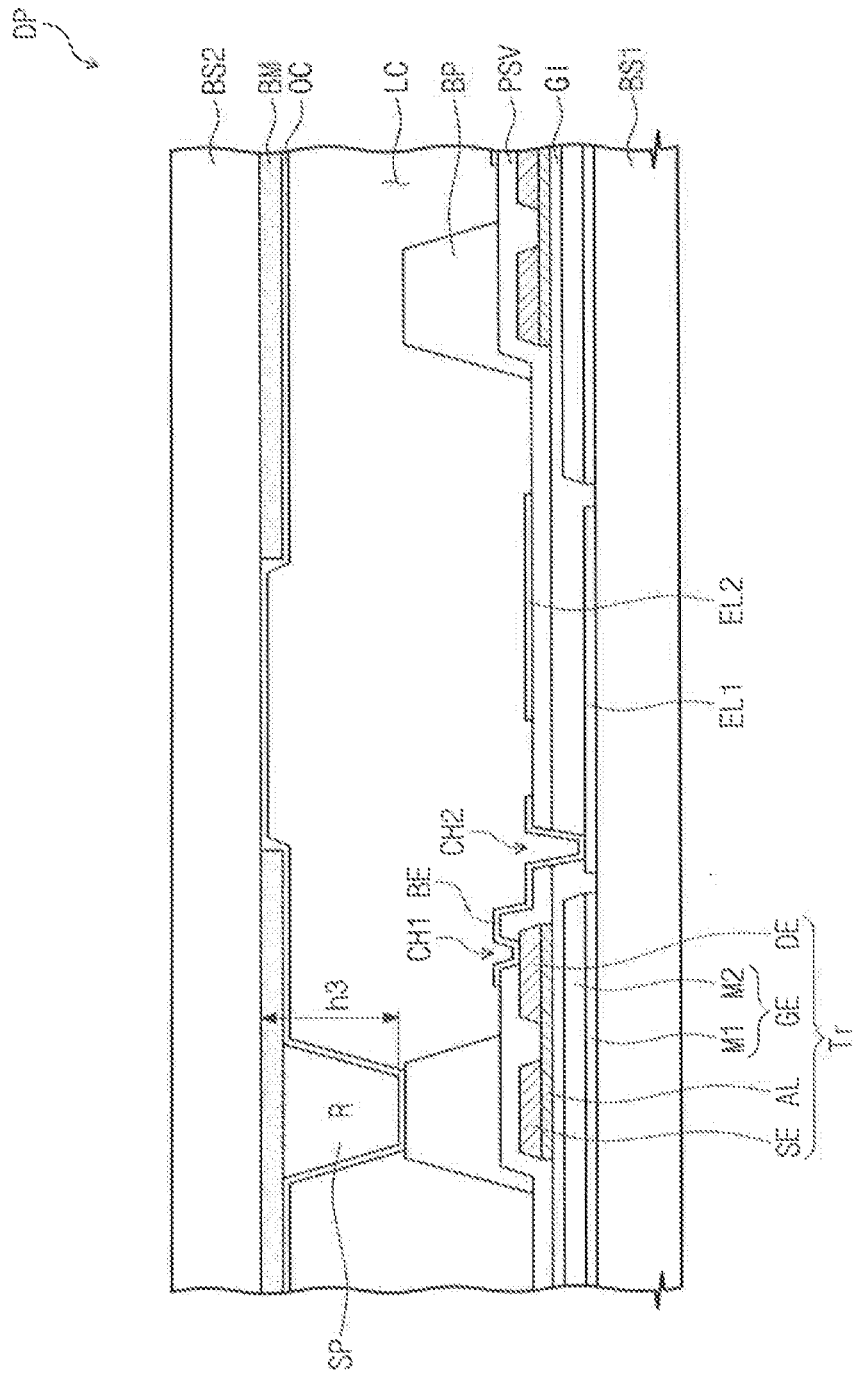
FIG. 4B is a cross-sectional view taken along line II-II' shown in FIGS. 3A and 3B.

FIG. 3A is a plan view showing the first substrate of the liquid crystal display panel according to an exemplary embodiment of the present invention, FIG. 3B is a plan view showing the second substrate of the liquid crystal display panel according to an exemplary embodiment of the present invention, FIG. 4A is a cross-sectional view taken along line I-I' shown in FIGS. 3A and 3B, and FIG. 4B is a cross-sectional view taken along line II-II' shown in FIGS. 3A and 3B.

Referring to FIGS. 3A, 3B, 4A, and 4B, the liquid crystal display panel included in the image display part DP includes the first substrate SUB1, the second substrate SUB2 facing the first substrate SUB1, and the liquid crystal layer LC interposed between the first and second substrates SUB1 and SUB2.

The first substrate SUB1 includes a first base substrate BS1 formed of a transparent glass or plastic, and a first gate line Gi−1, a second gate line Gi, a first data line Dj, and a second data line Dj+1, which are disposed on the first base substrate BS1.

The first and second gate lines Gi−1 and Gi extend in a first direction A1 and are arranged in a second direction A2 crossing the first direction A1 to be spaced apart from each other by a predetermined distance. The first and second data lines Dj and Dj+1 extend in the second direction A2 and are arranged in the first direction A1 to be spaced apart from each other by a predetermined distance.

The first and second gate lines Gi−1 and Gi are electrically insulated from the first and second data lines Dj and Dj+1 by a gate insulating layer GI. The first and second data lines Dj and Dj+1 are covered by a protective layer PSV.

Each of the first and second data lines Dj and Dj+1 is bent in a symmetrical shape with respect to a center line passing through a center portion in distance between the first and second gate lines Gi−1 and Gi and substantially parallel to the first and second gate lines Gi−1 and Gi.

The first electrode EL1, the thin film transistor Tr, and the second electrode EL2 are further disposed on the first base substrate BS1. For example, the thin film transistor Tr includes a gate electrode GE corresponding to a portion of the second gate line Gi, a source electrode SE branched from the first data line Dj, and a drain electrode DE disposed above the gate electrode GE and spaced apart from the source electrode SE by a predetermined distance.

The gate electrode GE has a double-layer structure of two electrode layers M1 and M2 stacked on one another. The lower layer M1 of the gate electrode GE includes a transparent conductive material, e.g., indium tin oxide, indium zinc oxide, etc., and the upper electrode M2 includes a metal layer, e.g., aluminum, copper, molybdenum, etc.

The first electrode EL1 includes substantially the same material as that of the lower layer M1 of the gate electrode GE. For example, the first electrode EL1 is overlapped with a pixel area defined by the first and second gate lines Gi−1 and Gi and the first and second data lines Dj and Dj+1. The first electrode EL1 may be integrally formed as a single, individual unit in the pixel area.

In an exemplary embodiment, the gate electrode GE and the first electrode EL1 may include different materials and have different shapes. For example, the gate electrode GE may have a single-layer structure or a multi-layer structure of a metal material, e.g., aluminum, copper, molybdenum, etc. In this case, the gate electrode GE need not include the transparent conductive material of the first electrode EL1. For example, the first electrode EL1 may include a transparent conductive material which is different from the gate electrode GE.

The gate electrode GE and the first electrode EL1 are covered by the gate insulating layer GI. An active layer AL is disposed on the gate insulating layer GI. Although not shown in the drawings, first and second ohmic contact layers are disposed on the active layer AL and spaced apart from each other. The source electrode SE is disposed on the first ohmic contact layer and the drain electrode DE is disposed on the second ohmic contact layer.

The source electrode SE and the drain electrode DE are covered by the protective layer PSV. A first contact hole CH1 penetrates the protective layer PSV to expose a portion of the drain electrode DE. A second contact hole CH2 penetrates the protective layer PSV and the gate insulating layer GI to expose a portion of the first electrode EL1. The first contact hole CH1 is adjacent to the second contact hole CH2.

A bridge electrode BE is disposed on the protective layer PSV to electrically connect the drain electrode DE and the first electrode EL1 through the first and second contact holes CH1 and CH2.

The first and second data lines Dj and Dj+1 are disposed above the gate insulating layer GI and extend in the second direction A2. The first and second data lines Dj and Dj+1 are covered by the protective layer PSV.

A bump BP is disposed along the first and second data lines Dj and Dj+1 on the protective layer PSV. The bump BP is formed in a line shape as the first and second data lines Dj and Dj+1. Alternatively, the bump BP may be divided into plural portions, and each of the plural portion is disposed in the unit of pixel.

When viewed in the first direction A1 substantially perpendicular to the extension direction of the first and second data lines Dj and Dj+1, the bump BP has a trapezoid shape in a cross section. The bump BP has a height h1 of about 2 micrometers to about 4 micrometers.

The second electrode EL2 includes a shield electrode part P1 to shield the bump BP and a common electrode part P2. The common electrode part P2 is disposed at a center of the first electrode EL1. The shield electrode part P1 and the common electrode part P2 extend substantially parallel to the first and second data lines Dj and Dj+1. The shield electrode part P1 and the common electrode part P2 are electrically connected to each other to receive the reference voltage Vcom (refer to FIG. 2).

A slit SL is formed between the shield electrode part P1 and the common electrode part P2 of the second electrode EL2. A width W1 of the common electrode part P2 is smaller than a width W2 of the slit SL. The width W1 ranges from about 1.5 micrometers to about 3 micrometers, and the width W2 ranges from about 2.0 micrometers to about 4 micrometers. For example, when the width W1 is about 3 micrometers, the width W2 is about 3.5 micrometers.

The shield electrode part P1 has a structure to shield or cover upper and side surfaces of the bump BP. Both ends of the shield electrode part P1 extend toward the common electrode part P2, partially overlapping the first electrode EL1. Accordingly, the shield electrode part P1 is partially overlapped with the first electrode EL1. For example, a width W5 of the overlapped region between the shield electrode part P1 and the first electrode EL1 is about 1.5 micrometers.

A width W3 in the first direction A1 of the bump BP is about one and half or about two times greater than a width W4 of the first and second data lines Dj and Dj+1. For example, when the width W3 is about 4 micrometers, the width W4 is about 2 micrometers.

The bump BP includes an organic insulating material having a low dielectric constant, e.g., about 3.2 or less, to reduce a capacitance between the shield electrode part P1 and the first and second data lines Dj and Dj+1. As described above, since the bump BP is shielded or covered by the shield electrode part P1, the electric field caused by the first and second data lines Dj and Dj+1 is shielded. As a result, the liquid crystal molecules disposed in the vicinity of the first and second data lines Dj and Dj+1 may be prevented from malfunctioning.

Further, the shield electrode part P1 is disposed along the upper and side surfaces of the bump BP, and thus the shield electrode part P1 has a shape protruded toward the second substrate SUB2. Accordingly, an electric field EF1 is formed between the shield electrode part P1 disposed on the side surface of the bump BP and the first electrode EL1 so that the liquid crystal molecules disposed in the vicinity of the second substrate SUB2 are controlled to increase the transmittance of the liquid crystal display panel DP without increasing a driving voltage.

The second substrate SUB2 includes a second base substrate BS2 formed of a transparent glass or plastic, a plurality of color filters CF disposed on the second base substrate BS2, a black matrix BM disposed between the color filters CF to block the light traveling thereto, and a spacer SP disposed on the black matrix BM and protruded toward the first substrate SUB1.

The black matrix BM is disposed between the color filters CF to block the light leaking through the pixels.

The black matrix BM is disposed in a light blocking area NDA of the liquid crystal display panel DP. In the liquid crystal display panel DP, an area in which the image is displayed may be referred to as a display area DA and an area in which no image is displayed may be referred to as the light blocking area NDA. The light blocking area NDA corresponds to an area in which the data lines, the thin film transistor, and the gate lines are disposed. The liquid crystal molecules disposed above the data lines, the thin film transistor, and the gate lines may be malfunctioned due to the electric field caused by the data lines, the thin film transistor, and the gate lines, and thus a light leakage may occur. The black matrix BM may serve to prevent the light from leaking to the light blocking area NDA.

The black matrix BM has a thickness of about 0.5 micrometers to about 1.5 micrometers. For example, the black matrix BM has a thickness of about 1 micrometers.

The color filters CF assign colors to the light passing through the liquid crystal layer LC. The color filters CF include red, green, and blue color pixels R, G, and B. The combined pixels of the red color pixel R, the green color pixel G, and the blue color pixel B display a color image. The present invention is not limited thereto. For example, the color filters CF may include at least one of a magenta color pixel, a yellow color pixel, and a cyan color pixel.

For example, the red, green, and blue color pixels R, G, and B are arranged in the first direction A1. Two color pixels adjacent to each other are spaced apart from each other in the first direction A1 by a predetermined distance. Alternatively, the red, green, and blue color pixels R, G, and B may be arranged in the second direction A2, and two color pixels adjacent to each other are spaced apart from each other in the second direction A2 by a predetermined distance.

The color filter CF is partially overlapped with the black matrix BM at the boundary between the color filter CF and the black matrix BM.

The color filter CF has a height h2 of about 1.5 micrometers to about 2.5 micrometers. For example, the height h2 may be about 2 micrometers.

The spacer SP is protruded toward the first base substrate BS1 from the second base substrate BS2. The spacer SP is disposed on the second base substrate BS2 in the light blocking area NDA. The spacer SP overlaps the black matrix BS when viewed from the above. For example, the spacer SP is disposed in an area corresponding to an area of the first substrate SUB1, in which the bump BP is disposed, and the spacer SP is overlapped with a portion of the bump BP when viewed from the above.

The spacer SP has a height h3 of about 1 micrometers to about 3.0 micrometers. For example, the height h3 may be about 2 micrometers.

The first substrate SUB1 is in contact with the second substrate SUB2 in the area in which the spacer SP and the bump BP are formed. A combined structure of the spacer SP and the bump supports the first substrate SUB1 and the second substrate SUB2 so that a distance of a cell gap between the substrates SUB1 and SUB2 is maintained.

The spacer SP may be substantially simultaneously formed with one of the color pixels through the same process. The spacer SP may be formed of the same material as the one of the color pixel. For example, the spacer SP is formed of the same material as the red color pixel R among the color pixels. The present invention is not limited thereto. For example, the spacer SP may be formed of the same material as that of the green color pixel G or the blue color pixel B.

When viewed from the above, the spacer SP has a dot shape, e.g., a circular dot shape or an oval dot shape, as shown in FIG. 3B. The present invention, however, is not limited thereto.

The spacer SP is disposed on the bump BP. An overcoating layer OC is interposed between the spacer SP and the bump BP. Alternatively, the spacer SP is in direct contact with the bump.

The overcoating layer OC covers the color filter CF, the black matrix BM, and the spacer SP. The overcoating layer OC has a height of about 0.3 micrometers to about 1 micrometers. For example, the overcoating layer OC has the height of about 0.55 micrometers.

FIG. 3B shows one spacer SP for the convenience of description. The spacer SP serves to support the substrates SUB1 and SUB2 together with the bump so that a gap spacing between the substrates SUB1 and SUB2 is maintained. Accordingly, the number of spacers SP may be determined to provide such support to the substrates SUB1 and SUB2. For example, the spacer SP may be disposed in each pixel to maintain the gap spacing between the substrates SUB1 and SUB2. Alternatively, the spacer SP need not be disposed in each pixel if such arrangement of the spacers SP provides the support necessary to maintain the gap spacing between the substrates SUB1 and SUB2.

The second substrate SUB2 faces the first substrate SUB1 and is coupled to the first substrate SUB1, and the liquid crystal layer LC is interposed between the first and second substrates SUB1 and SUB2.

When the gate signal is applied to the pixel through the second gate line Gi, the thin film transistor Tr is turned on in response to the gate signal. The data voltage applied to the first data line Dj is applied to the first electrode EL1 through the drain electrode DE of the thin film transistor Tr. The data voltage serves as the driving voltage to control the liquid crystal molecules of the liquid crystal layer LC.

The first electrode EL1 applied with the data voltage forms the electric field in cooperation with the second electrode EL2 applied with the reference voltage, and thus an alignment direction of the liquid crystal molecules in the liquid crystal layer LC is determined. The light passing through the liquid crystal layer LC is polarized in accordance with the alignment direction of the liquid crystal molecules.

The first and second electrodes EL1 and EL2 form the liquid crystal capacitor Clc (refer to FIG. 1) together with the liquid crystal layer LC, which serves as the dielectric substance, to maintain the voltage applied to the pixel after the thin film transistor Tr is turned off.

As described above, the cell gap may be determined by the bump BP and the spacer SP. The spacer SP may be substantially simultaneously formed with the color filters CF through the same process. Accordingly, an additional process is not necessary to form the spacer SP used to maintain the cell gap, and thus the manufacturing process of the liquid crystal display panel DP may be simplified.

Figure 5:
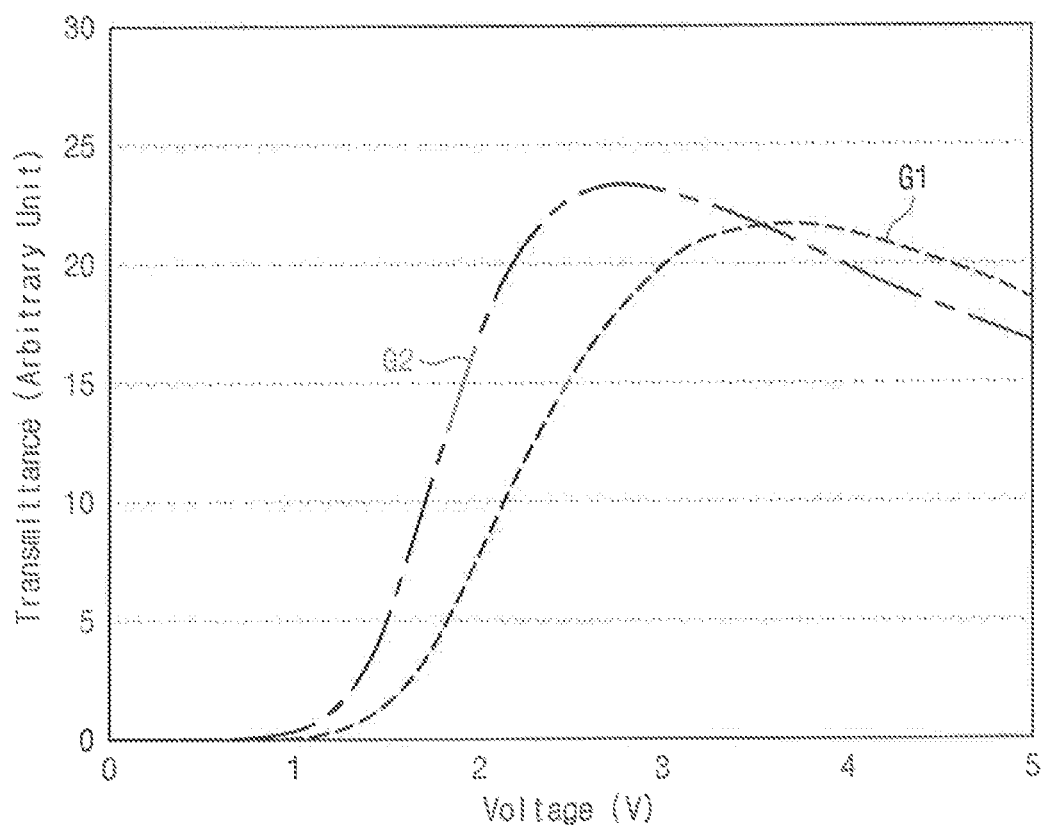
FIG. 5 is a graph showing a transmittance as a function of a driving voltage in a liquid crystal display according to an exemplary embodiment of the present invention.

FIG. 5 is a graph showing transmittance as a function of a driving voltage according to an exemplary embodiment of the present invention. In FIG. 5, a first graph G1 shows a variation in the transmittance against the driving voltage in the conventional liquid crystal display and a second graph G2 shows a variation in the transmittance against the driving voltage in the liquid crystal display in FIGS. 3A and 3B.

As shown in FIG. 5, the transmittance of the liquid crystal display panel shown in FIGS. 3A and 3B, which has a structure that the shield electrode part P1 is formed on the upper and side surfaces of the bump BP to control the liquid crystal molecules, is comparatively higher than that of the conventional liquid crystal display in the driving voltage of less than about 4 V. Accordingly, the liquid crystal display shown in FIGS. 3A and 3B may obtain the transmittance required to display an image using the driving voltage lower than that of the conventional liquid crystal display. As a result, the transmittance of the liquid crystal display is increased and the power consumption of the liquid crystal display is reduced.

Figure 6:
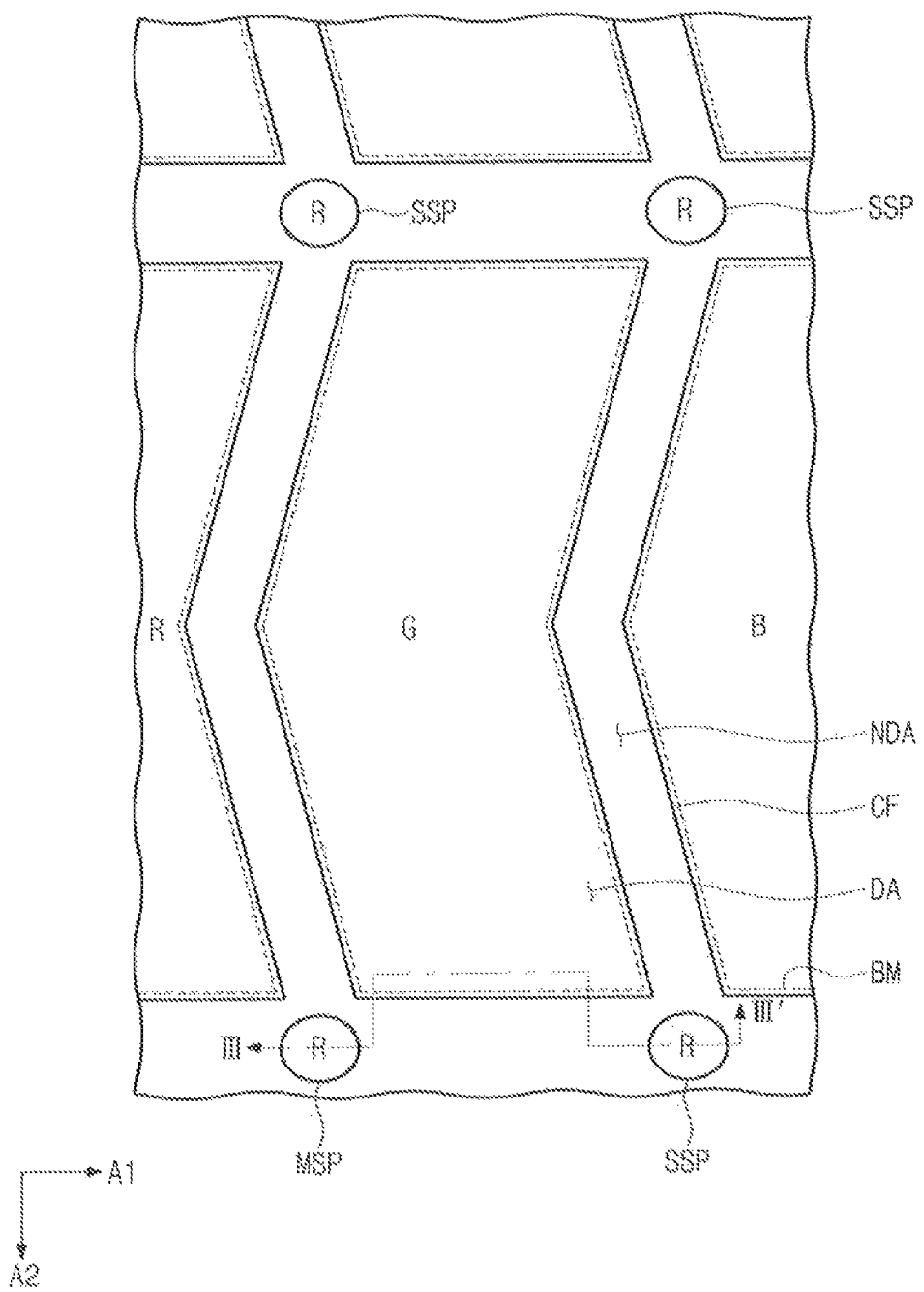
FIG. 6 is a plan view showing a liquid crystal display panel according to another exemplary embodiment of the present invention.
Figure 7:
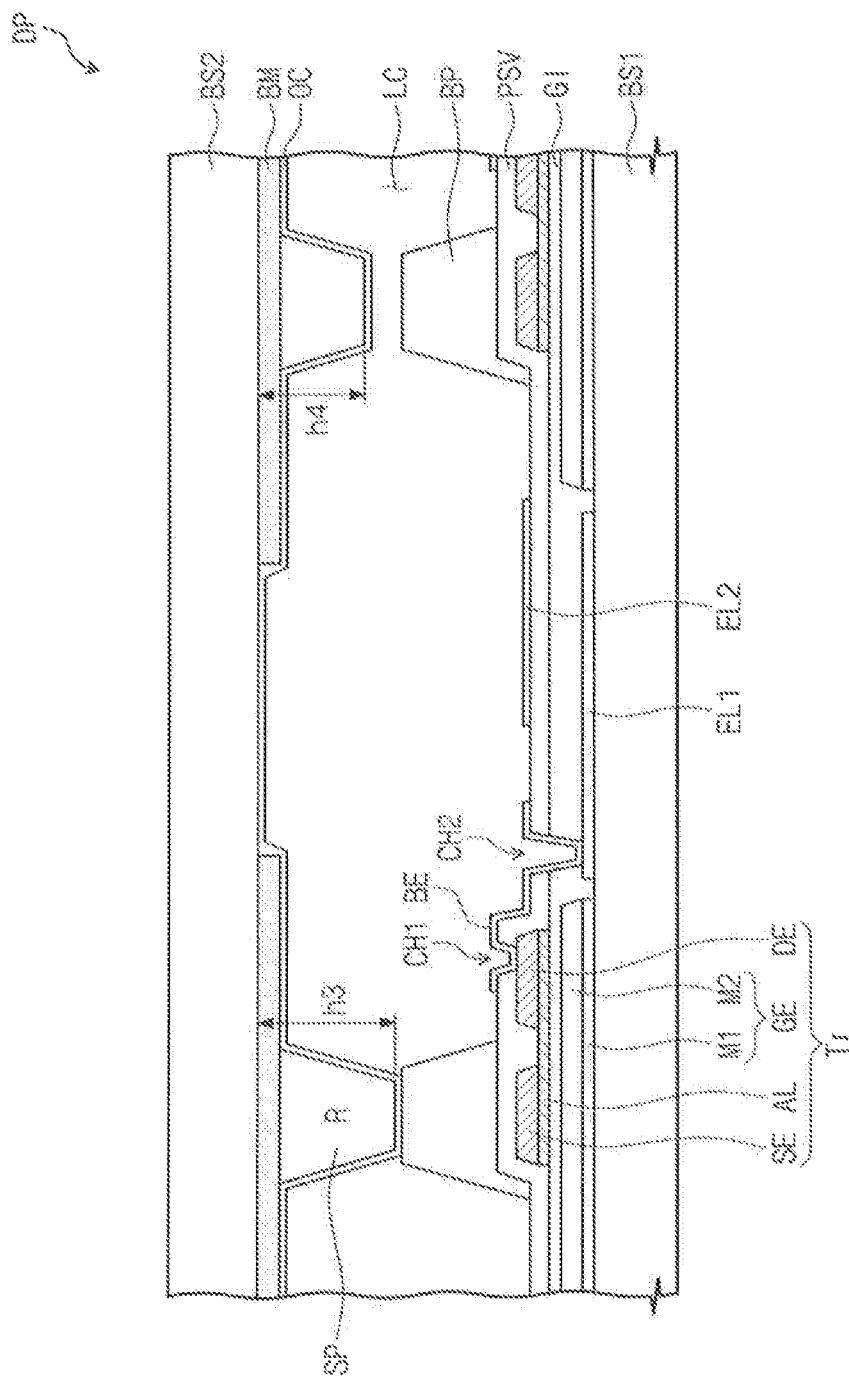
FIG. 7 is a cross-sectional view taken along a line III-III' shown in FIG. 6.

FIG. 6 is a plan view showing a liquid crystal display panel according to an exemplary embodiment of the present invention, and FIG. 7 is a cross-sectional view taken along line III-III' shown in FIG. 6. In FIGS. 6 and 7, the same reference numerals denote the same elements in FIGS. 1 to 4B, and thus detailed descriptions of the same elements will be omitted.

The line III-III' shown in FIG. 6 corresponds to the line II-II' shown in FIGS. 3A and 3B.

Referring to FIGS. 6 and 7, a second substrate SUB2 includes a second base substrate BS2 formed of a transparent glass or plastic, a plurality of color filters CF disposed on the second base substrate BS2, a black matrix BM disposed between the color filters CF to block the light traveling thereto, and a spacer disposed on the black matrix BM and protruded toward the first substrate SUB1.

The spacer includes a main spacer MSP having a first height h3 and a sub-spacer SSP having a second height h4 smaller than the first height. The first height h3 ranges from about 1 micrometers to about 3.0 micrometers. For example, the first height h3 may be about 2 micrometers. The second height h4 ranges from about 1.3 micrometers to about 1.8 micrometers.

Since the height h4 of the sub-spacer SSP is smaller than the height h3 of the main spacer MSP, the first substrate SUB1 and the second substrate SUB2 are spaced apart from each other in the area in which the sub-spacer SSP is disposed.

The sub-spacer SSP serves to prevent the first and second substrates SUB1 and SUB2 from making contact each other when an external force is applied. For example, when an external force is applied, the second substrate SUB2 may be curved toward the first substrate SUB1 in a region where the main spacer MSP does not exist. If the upper portion of the sub-spacer SSP may be in contact with the bump BP, the bump BP may stop the second substrate SUB2 from being further curved. Accordingly, the configuration of the sub-spacer SSP and the bump BP may serve to prevent elements of the liquid crystal display panel from being damaged when an external force is applied.

The main spacer MSP and/or the sub-spacer SSP may be substantially simultaneously formed with one of the color pixels using the same material as that of the one color pixel. The main spacer MSP and the sub-spacer SSP are formed of the same material as that of the red color pixel R. The present invention is not limited thereto. For example, the main spacer MSP and the sub-spacer SSP may be formed of the same material as that of the green color pixel G or the blue color pixel B.

According to FIG. 7, the main spacer MSP and the sub-spacer SSP are disposed in different pixels. However, the present invention is not limited thereto. For example, the main spacer MSP and the sub-spacer SSP may be provided in each pixel.

FIGS. 8A to 8E are plan views showing a method of manufacturing the first substrate shown in FIGS. 3A, 4A, and 4B. Hereinafter, the manufacturing method of the first substrate will be described with reference to FIGS. 3A, 4A and 4B, and 8A to 8E.

Figure 8A:
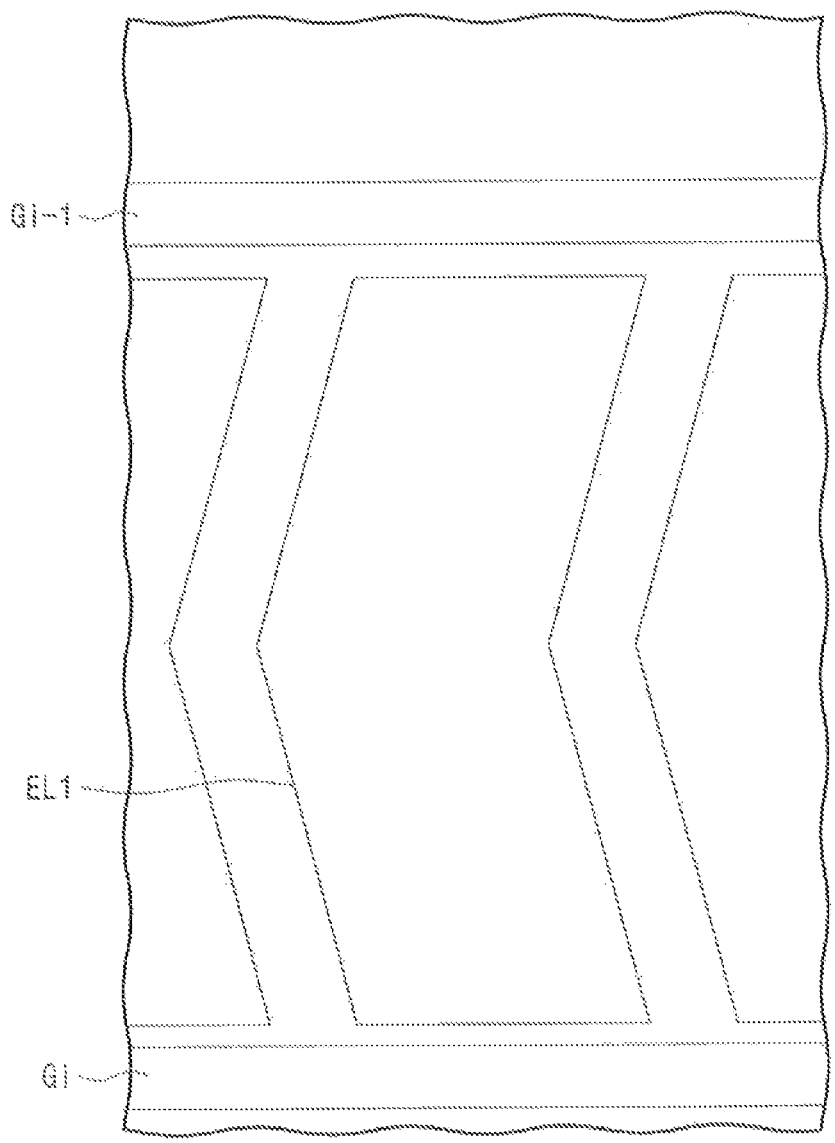
FIGS. 8A to 8E are plan views showing a method of manufacturing a first substrate shown in FIGS. 3A, 4A, and 4B.

Referring to FIG. 8A, the first and second gate lines Gi−1 and Gi and the first electrode EL1 are formed on the first base substrate BS. For example, first and second metal layers may be sequentially formed on the first base substrate BS1 and patterned using a first mask to form the first and second gate lines Gi−1 and Gi and the first electrode EL1 on the first base substrate BS. One of the first and second metal layers may be formed of a transparent conductive material, e.g., indium tin oxide, and the other of the first and second metal layers may be formed of an aluminum-based metal, e.g., aluminum (Al) or an alloy thereof, a silver-based metal, e.g., silver (Ag) or an alloy thereof, a copper-based metal, e.g., copper (Cu) or an alloy thereof, a molybdenum-based metal, e.g., molybdenum (Mo) or an alloy thereof, Chromium (Cr), tantalum (Ta), or titanium (Ti).

The first and second gate lines Gi−1 and Gi have a double-layer structure of the first and second metal layers sequentially stacked on one another, but the first electrode EL1 has a single-layer structure having one of the first and second metal layers. The first electrode EL1 is transparent.

Although not shown in FIG. 8A, the first and second gate lines Gi−1 and Gi and the first electrode EL1 are covered by the gate insulating layer GI. The gate insulating layer GI includes silicon nitride (SiNx) or silicon oxide (SiOx).

Figure 8B:
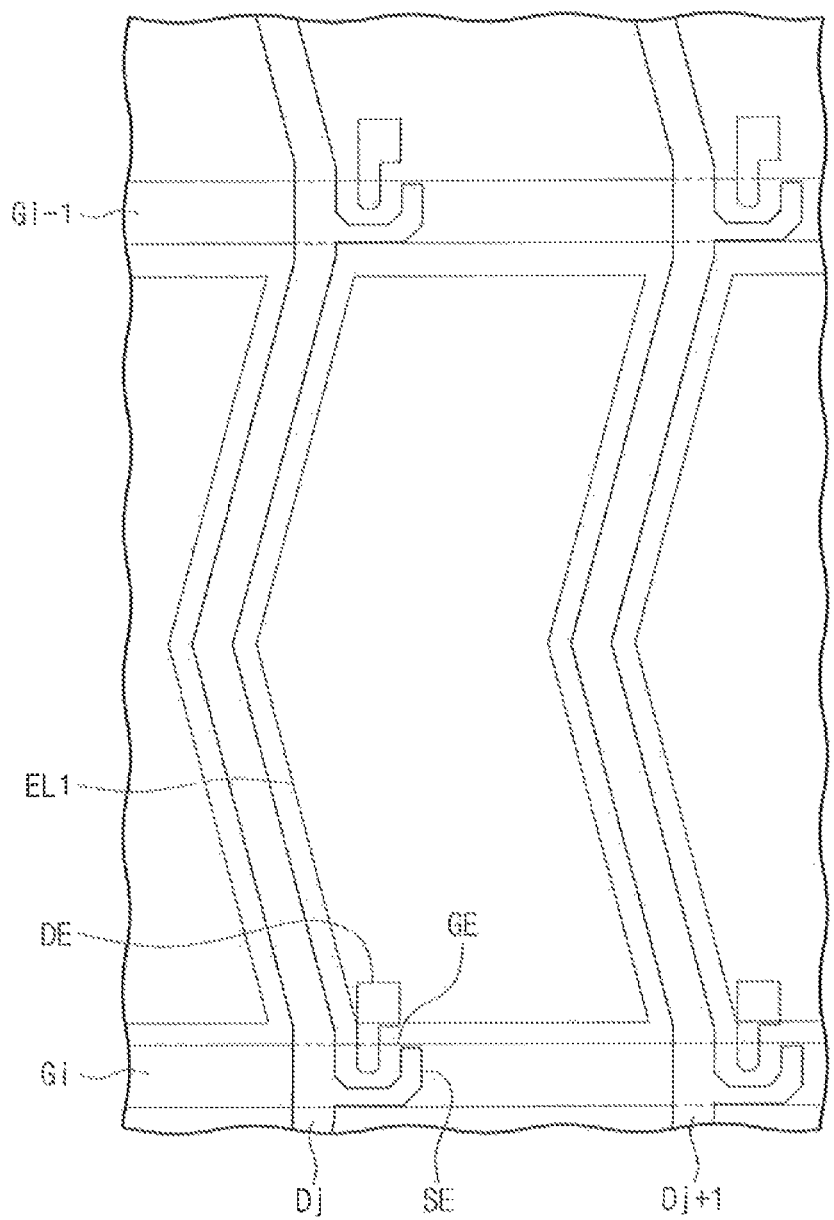

Referring to FIG. 8B, the source electrode SE, the drain electrode DE, and the first and second data lines Dj−1 and Dj are formed on the gate insulating layer GI. For example, third and fourth metal layers may be sequentially formed on the gate insulating layer GI and patterned using a second mask to form the source electrode SE, the drain electrode DE, and the first and second data lines Dj−1 and Dj. The third metal layer includes molybdenum, chromium, tantalum, or titanium, and the fourth metal layer includes copper.

A portion of each of the first and second gate lines Gi−1 and Gi, which faces the source electrode SE and the drain electrode DE, serves as the gate electrode GE.

Although not shown in FIG. 8B, a semiconductor layer AL (refer to FIG. 4B) formed of hydrogenated amorphous silicon, poly crystalline silicon, or semiconductor oxide and the first and second ohmic contact layers (not shown) may be formed between the gate electrode GE and the source electrode SE and between the gate electrode GE and the drain electrode DE.

However, the semiconductor layer AL and the first and second ohmic contact layers may be formed through the process of patterning the third metal layer using the second mask to form the thin film transistor Tr.

Although not shown in FIG. 8B, the source electrode SE, the drain electrode DE, and the first and second data lines Dj and Dj+1 may be covered by the protective layer PSV.

Figure 8C:
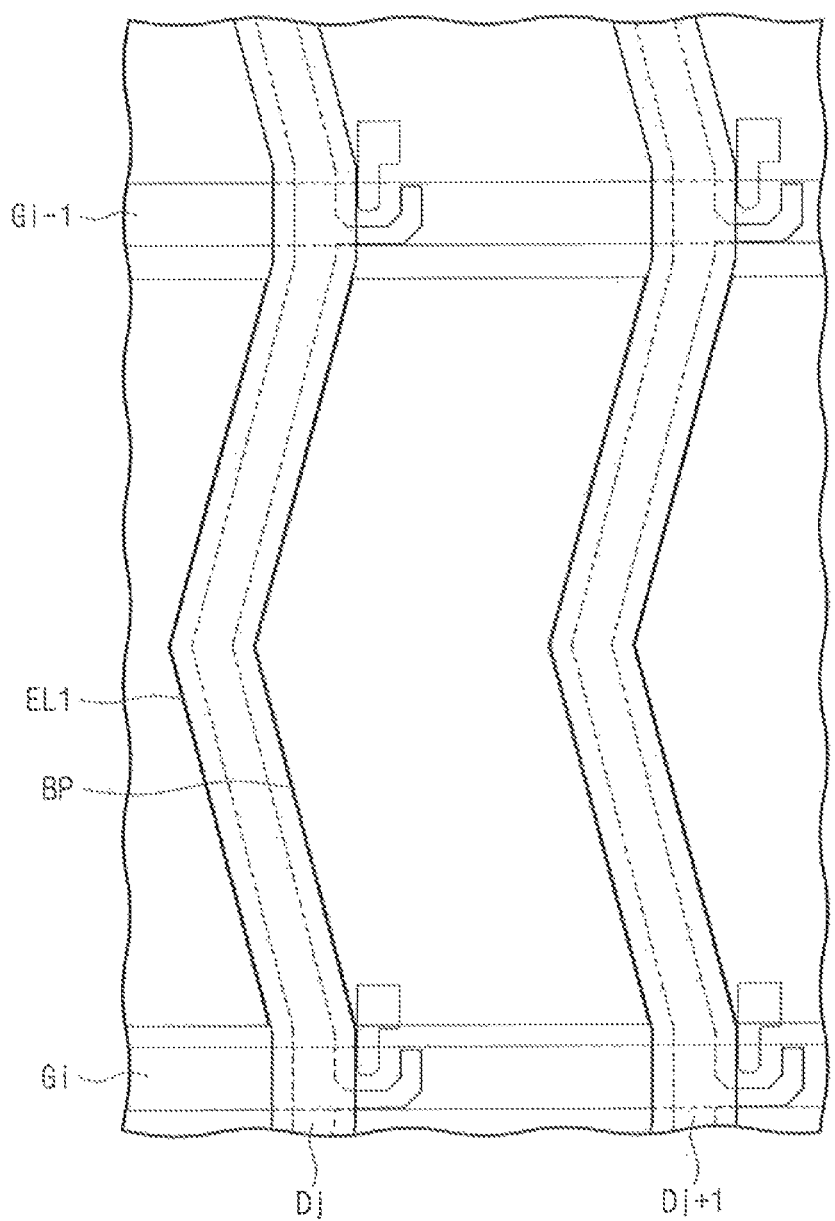

Referring to FIG. 8C, the organic insulating material having a low dielectric constant of about 3.0 or less is formed on the protective layer PSV. Then, when the organic insulating material is patterned using a third mask, the bump BP is formed along the first and second data lines Dj and Dj+1. The bump BP is a line shape extended along the first and second data lines Dj and Dj+1. Alternatively, the bump BP may be divided into plural portions in the unit of pixel.

Figure 8D:
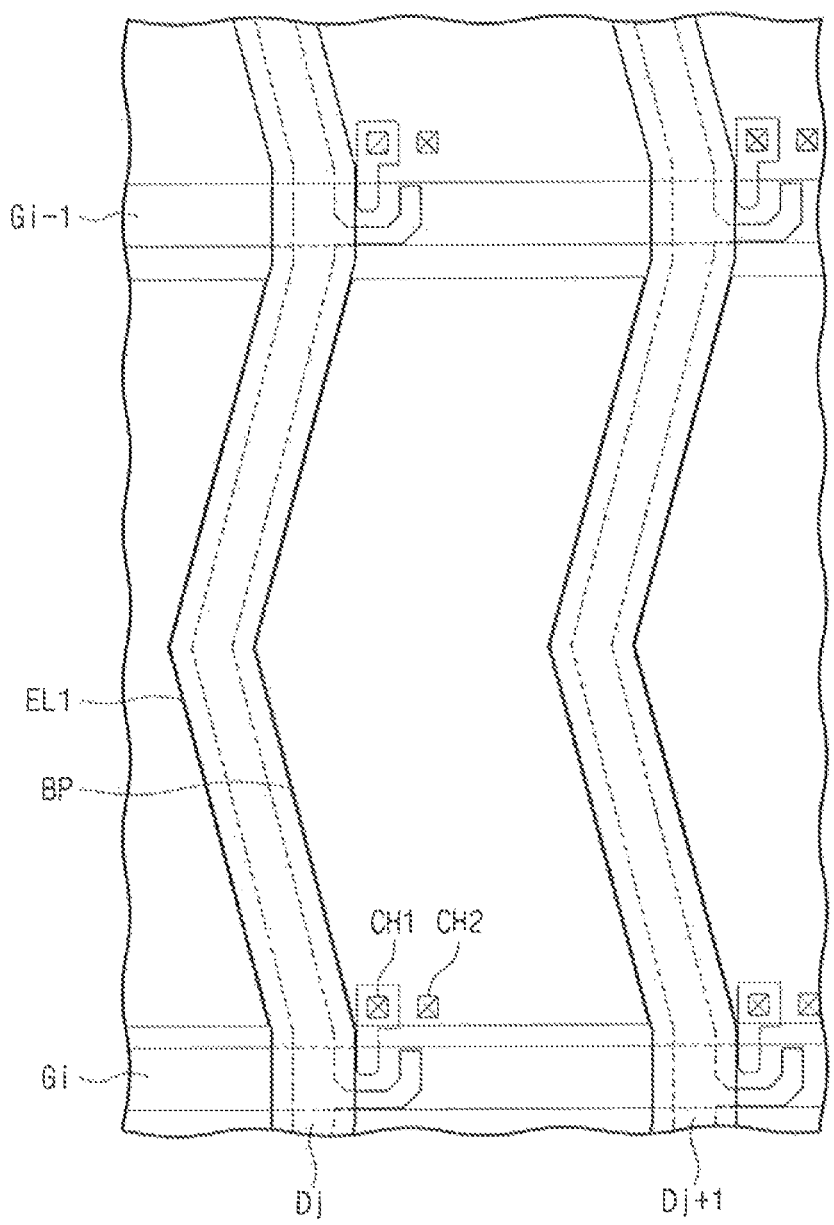

Referring to FIG. 8D, a first contact hole CH1 and a second contact hole CH2 are formed. For example, the protective layer PSV is patterned using a fourth mask to expose the drain electrode DE and the first electrode EL1 through the first contact hole CH1 and the second contact hole CH2, respectively.

Figure 8E:
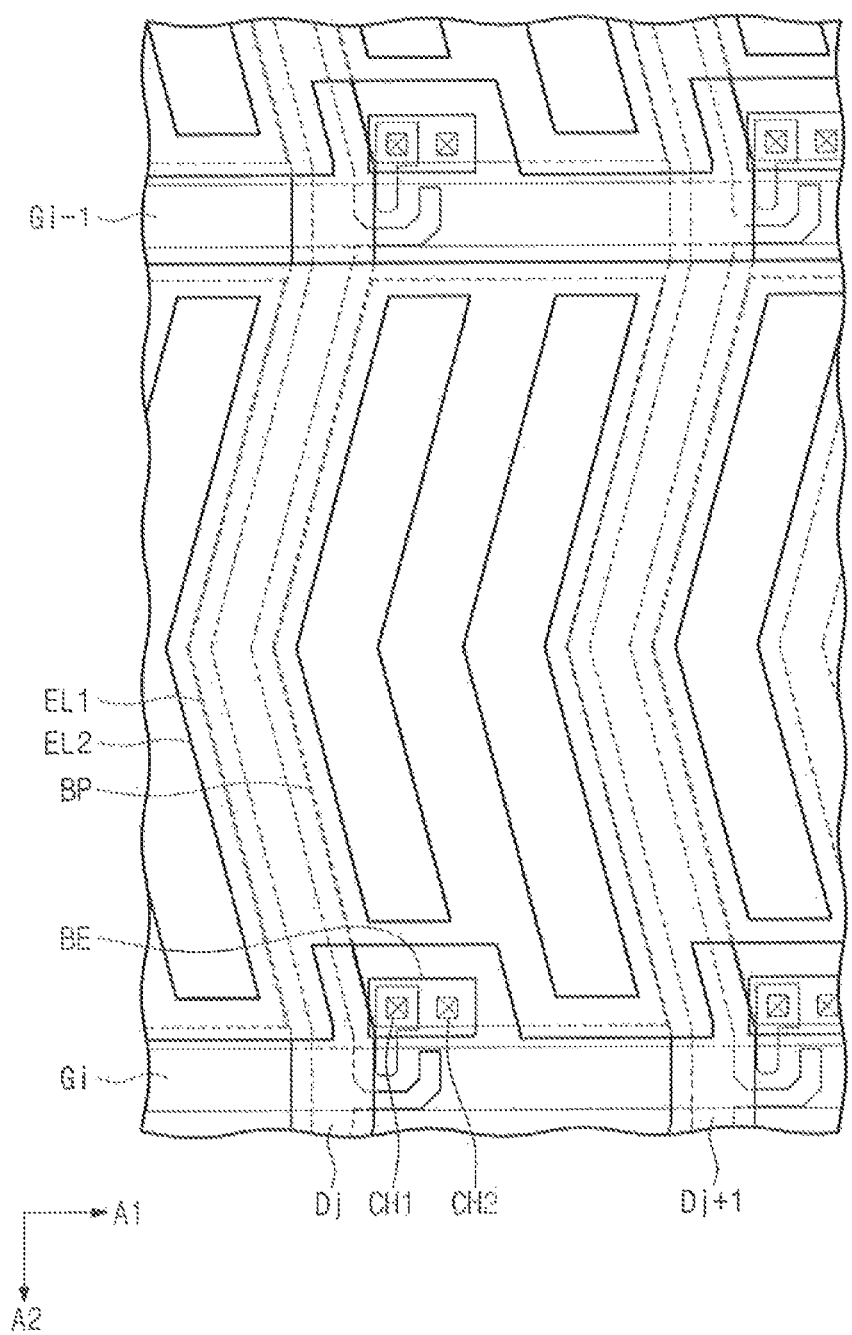

Referring to FIG. 8E, the second electrode EL2 and the bridge electrode BE are formed. For example, a transparent conductive material may be formed on the protective layer PSV and the bump BP, and the conductive material may be patterned using a fifth mask to form the second electrode EL2 and the bridge electrode BE.

The second electrode EL2 includes the shield electrode part P1 to shield or cover the bump BP and the common electrode part P2 disposed at the center of the first electrode EL1. The shield electrode part P1 and the common electrode part P2 extend along the first and second data lines Dj and Dj+1 to be substantially parallel to the first and second data lines Dj and Dj+1.

The slit SL is formed between the shield electrode part P1 and the common electrode part P2 of the second electrode EL2. The shield electrode part P1 shields the upper and side surfaces of the bump BP, and the shield electrode part P1 is partially overlapped with the first electrode EL1 at the boundary between the shield electrode part P1 and the first electrode EL1.

The bridge electrode is in contact with the drain electrode DE and the first electrode EL1 through the first contact hole CH1 and the second contact hole CH2, respectively. Accordingly, the drain electrode DE and the first electrode EL1 are electrically connected to each other by the bridge electrode BE.

Figure 9A:
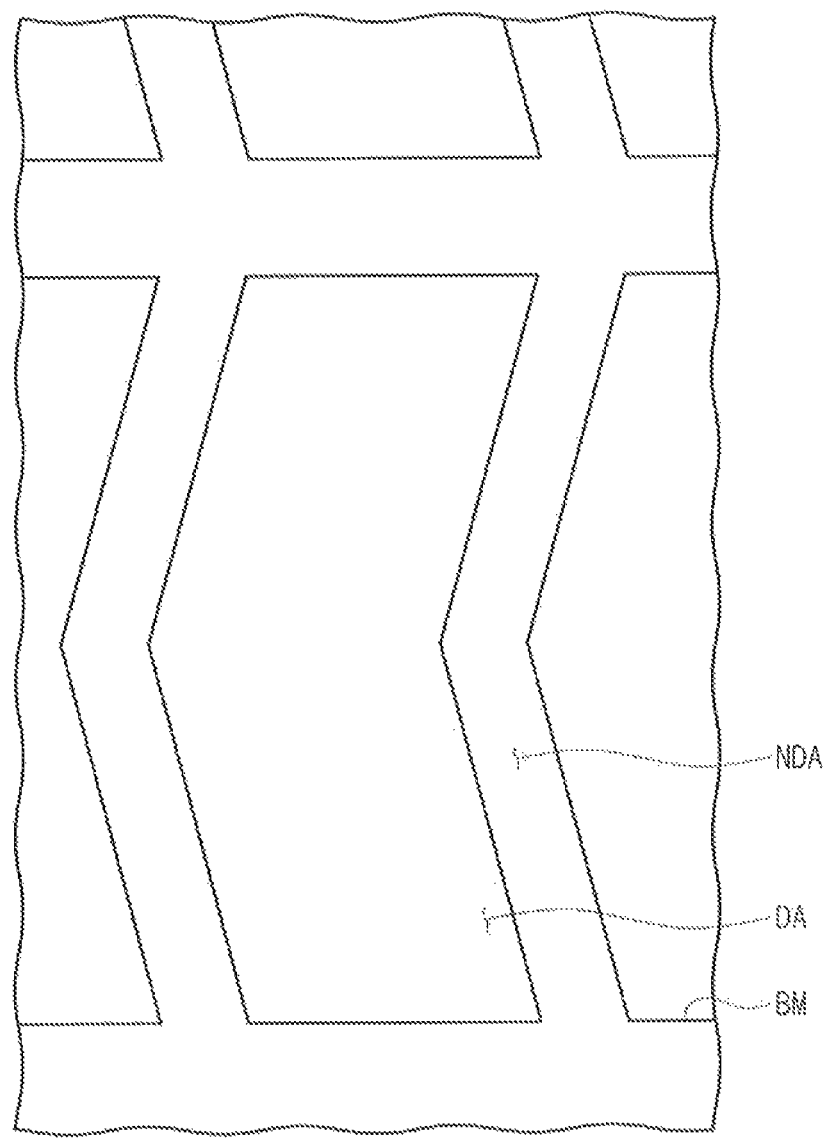
FIGS. 9A to 9C are plan views showing a method of manufacturing a second substrate shown in FIGS. 3B, 4A, and 4B.
Figure 9B:
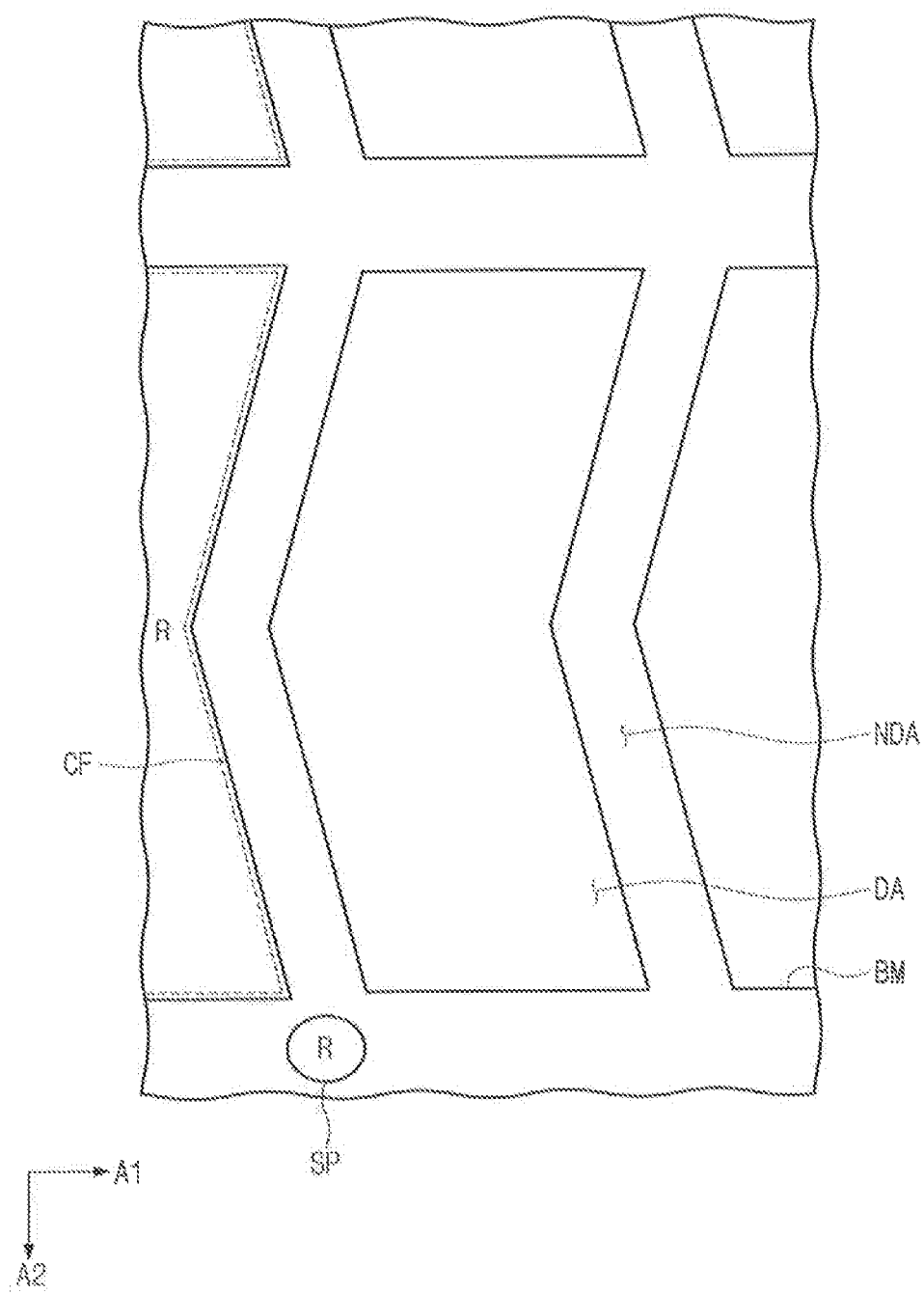
Figure 9C:
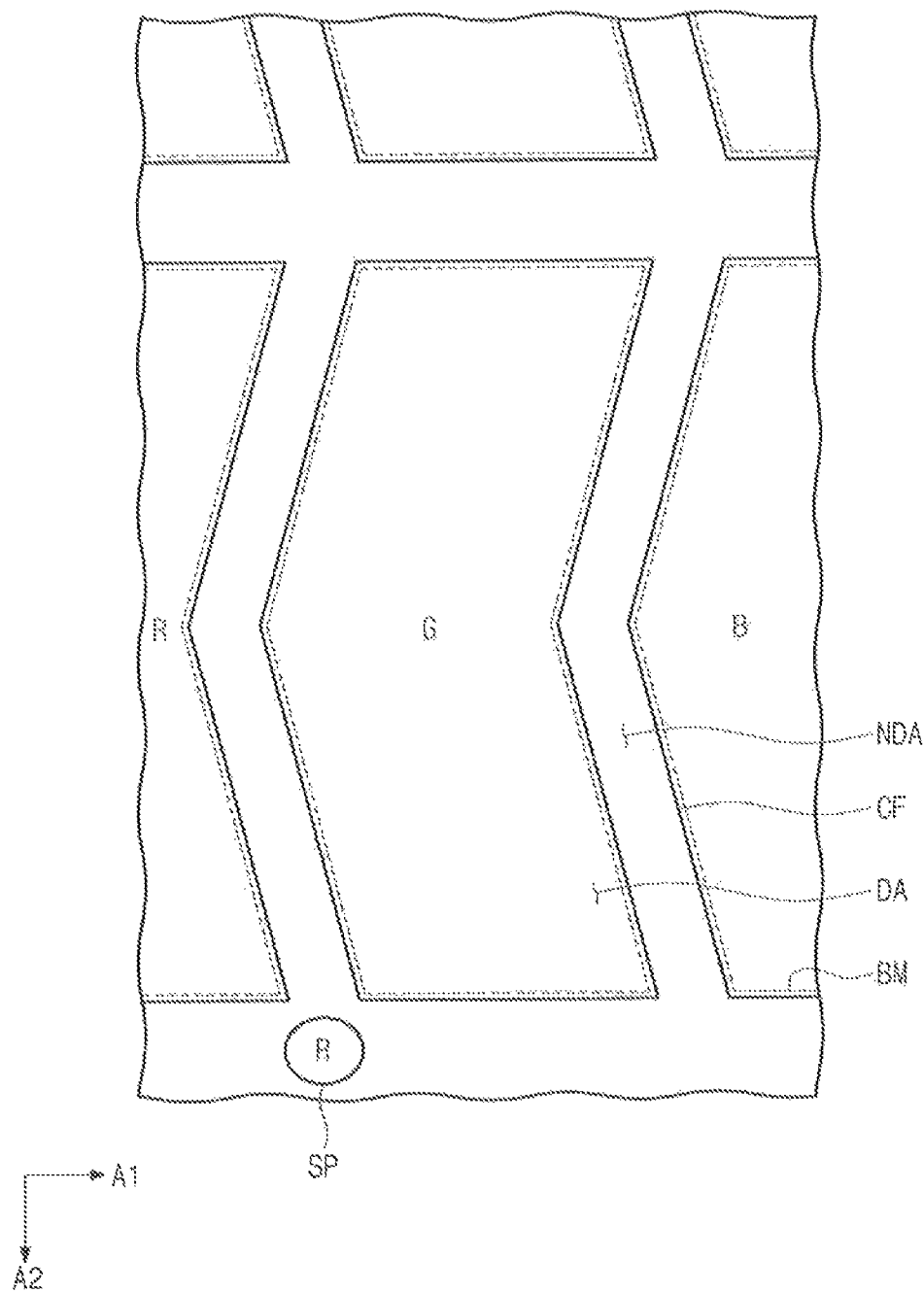

FIGS. 9A to 9C are plan views showing a method of manufacturing the second substrate shown in FIGS. 3B, 4A, and 4B. Hereinafter, the manufacturing method of the second substrate will be described with reference to 3B, 4A and 4B, and 9A to 9C.

Referring to FIG. 9A, the black matrix BM is formed. For example, a light blocking material may be formed on the second base substrate BS2 and patterned using the fifth mask to form the black matrix BM. The black matrix BM is formed in the light blocking area NDA except for the display area DA in which the image is displayed. The light blocking area NDA corresponds to the area in which the gate line, the data line, and the thin film transistor are formed.

Referring to FIGS. 9B and 9C, the color filters CF and the spacer SP are formed on the second base substrate BS2, on which the black matrix BM is formed, using sixth, seventh, and eighth masks. When the color filters CF include the red, green, and blue color pixels R, G, and B, the red, green, and blue color pixels R, G, and B may be formed in a predetermined order. For example, the red color pixel R is formed as shown in FIG. 9A, and then the green and blue color pixels G and B are sequentially formed as shown in FIG. 9C.

The spacer SP is formed together with the one color pixel when the color pixel is formed. For example, when the red color pixel R is formed as shown in FIG. 9B, the red color pixel R and the spacer SP may be substantially simultaneously formed by coating a red photoresist on the entire surface of the second base substrate BS2, partially exposing portions of the red photoresist to a light using the sixth mask, and developing the red photoresist.

If the spacer includes the main spacer MSP and the sub-spacer SSP, which have the different heights, the main spacer MSP and the sub-spacer SSP may be formed through a photolithography process using a halftone mask when the one color pixel is formed. For example, the one color pixel, the main spacer MSP, and the sub-spacer SSP may be formed by a single photolithography process using one mask.

Referring to FIG. 9C, the other pixels, i.e., the green and blue color pixels G and B, are formed and the overcoating layer OC is formed to complete the formation of the second substrate SUB2.

Then, the liquid crystal layer is formed between the first and second substrates SUB1 and SUB2 to form the liquid crystal display.

Figure 10A:
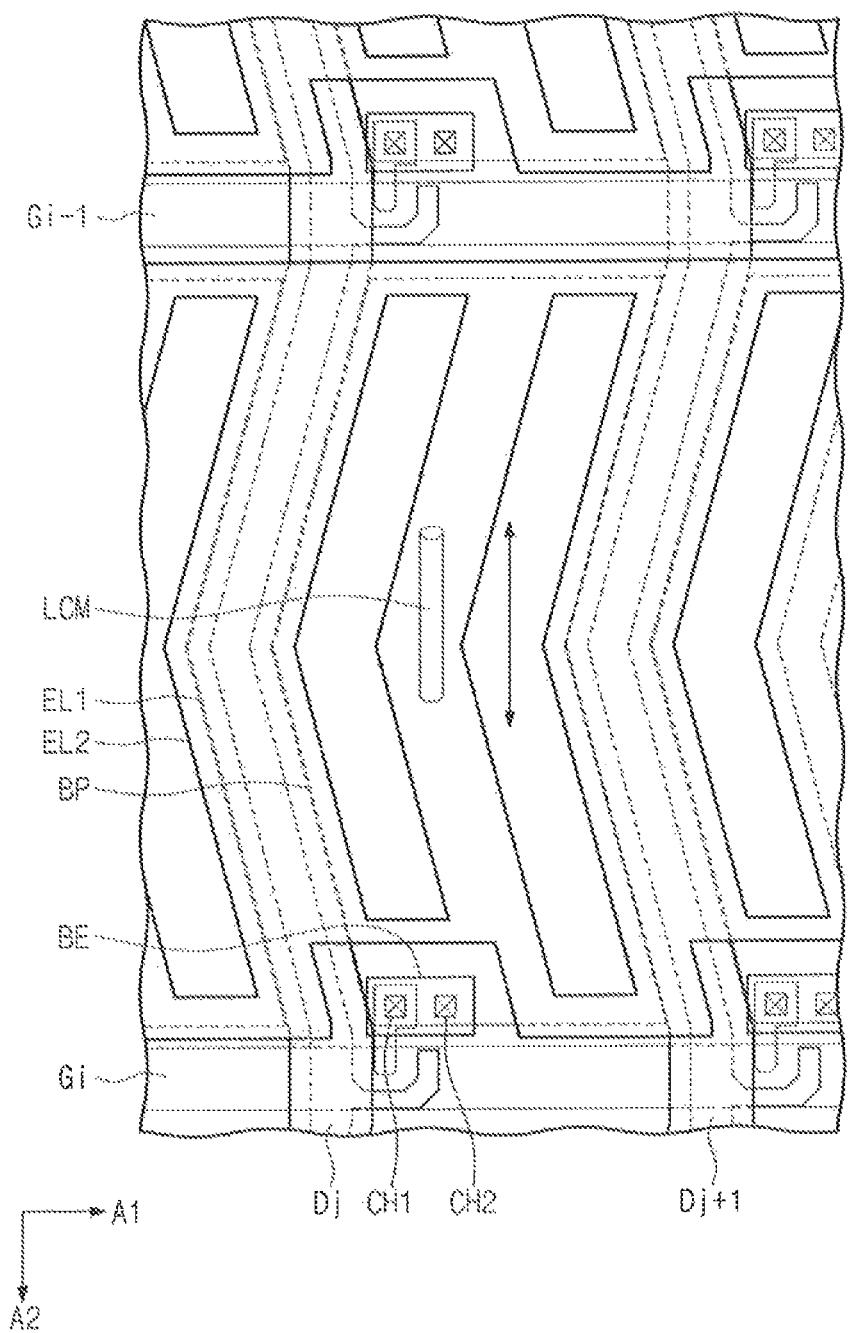
FIG. 10A is a plan view showing an alignment direction of an optical alignment layer according to an exemplary embodiment of the present invention.
Figure 10B:
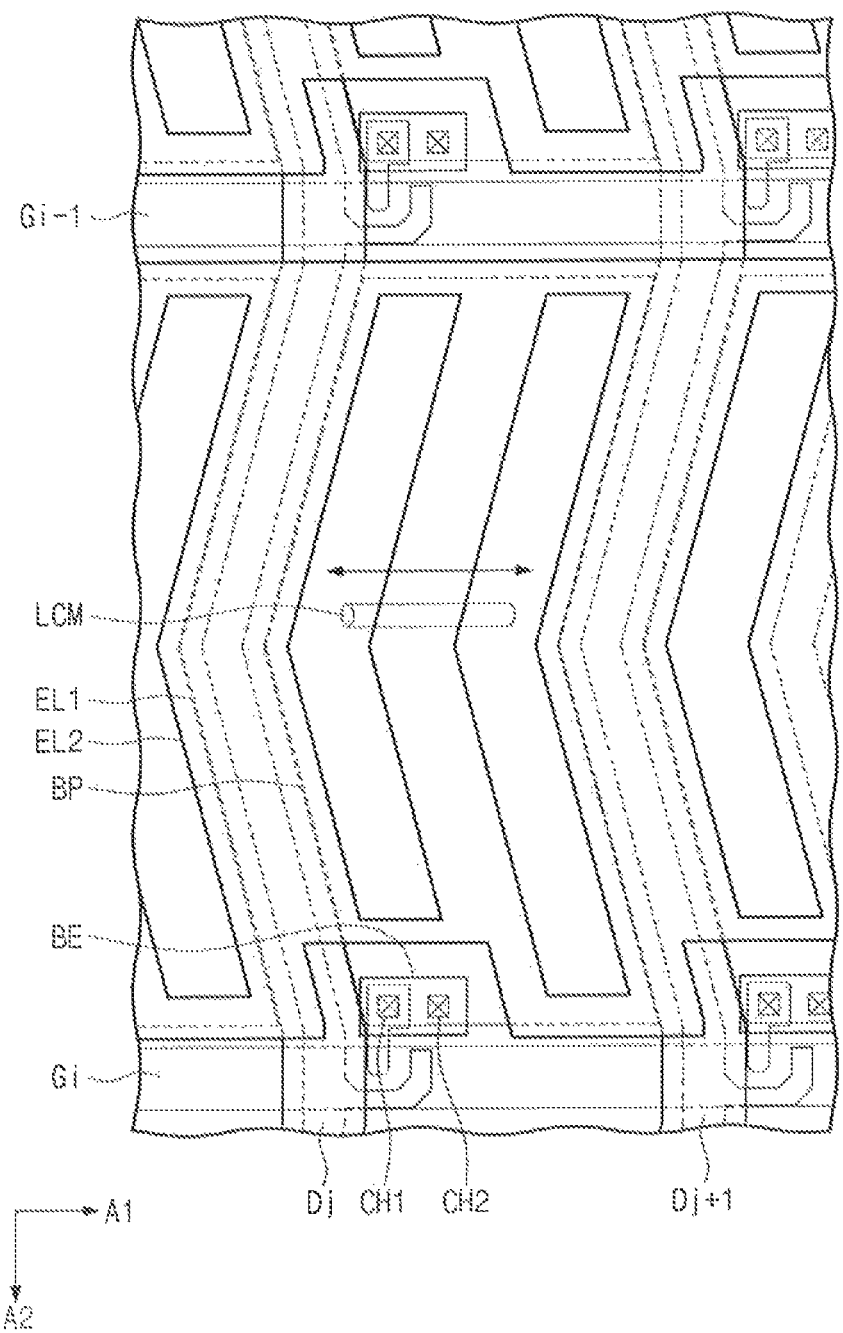
FIG. 10B is a plan view showing an alignment direction of an optical alignment layer according to another exemplary embodiment of the present invention.

FIG. 10A is a plan view showing an alignment direction of an optical alignment layer according to an exemplary embodiment of the present invention and FIG. 10B is a plan view showing an alignment direction of an optical alignment layer according to another exemplary embodiment of the present invention.

Referring to FIGS. 10A and 10B, an alignment layer may be formed on the second electrode EL2. The alignment layer may include a polymer material in which a decomposition, dimerization, or isomerization reaction occurs by light (e.g., an ultraviolet ray or a laser).

The alignment layer may be aligned by an optical alignment method. Alternatively, the alignment layer may be alighted by rubbing the alignment layer. For the optical alignment method, a planarization process to planarize the lower layer under the alignment layer may be eliminated. Accordingly, although the first substrate SUB1 is not flat due to the bump BP, an alignment defect does not occur.

As shown in FIG. 10A, when the liquid crystal molecules LCM are positive liquid crystal molecules, the alignment layer is optically aligned such that the liquid crystal molecules LCM are aligned in the second direction A2 in which the first and second data lines Dj and Dj+1 extend.

As shown in FIG. 10B, when the liquid crystal molecules LCM are negative liquid crystal molecules, the alignment layer is optically aligned to allow the liquid crystal molecules LCM to be aligned in the first direction A1 in which the first and second gate lines Gi−1 and Gi extend.

While the present invention has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A liquid crystal display comprising:
   a first substrate;
   a second substrate facing the first substrate; and
   a liquid crystal layer interposed between the first and second substrates,
   wherein the first substrate comprises:
   a first base substrate;
   a first electrode disposed on the first base substrate;
   a second electrode including a shield electrode part and a common electrode part,
   wherein the second electrode is insulated from the first electrode and overlapped with the first electrode;
   a gate line disposed on the first base substrate;
   a data line crossing the gate line;
   a first bump which is protruded from the first base substrate extends along the data line and is disposed on the data line;
   wherein the first bump comprises a first part which is covered by the shield electrode and a second part which is not covered by the shield electrode, and
   wherein the second substrate comprises:
   a second base substrate;
   a color filter layer including a plurality of color pixels disposed on the second base substrate; and
   a spacer overlapping a portion where the gate line and the data line cross each other, the spacer protruded toward the first substrate,
   wherein the spacer comprises a same material as at least one of the plurality of color pixels, and
   wherein a combined structure of the spacer and the second part of the first bump is configured to support the first and second substrates.

2. The liquid crystal display of claim 1,
   wherein the spacer has a height greater than a height of each of the plurality of color pixels.

3. The liquid crystal display of claim 2,
   wherein the first substrate is in contact with the second substrate in an area where the spacer and the first bump are overlapped.

4. The liquid crystal display of claim 1,
   wherein the first substrate is in contact with the second substrate in a first area where the main spacer is disposed, and
   wherein the first substrate is spaced apart from the second substrate in a second area where the sub-spacer is disposed.

5. The liquid crystal display of claim 1,
   wherein the first substrate further comprises:
   a thin film transistor connected to the gate line and the data line to apply a driving voltage to the first electrode, and
   wherein the second substrate further comprises:
   a black matrix disposed on the second base substrate, wherein the black matrix is disposed on the gate line, the data line, and the thin film transistor.

6. The liquid crystal display of claim 5,
wherein the spacer is disposed on the black matrix.

7. The liquid crystal display of claim 1,
wherein the plurality of color pixels comprises at least one of a red color pixel, a green color pixel, and a blue color pixel.

8. The liquid crystal display of claim 7,
wherein the spacer comprises a same material as the red color pixel.

9. The liquid crystal display of claim 1,
wherein the spacer has an oval shape or a circular shape.

10. The liquid crystal display of claim 1,
wherein the common electrode part is disposed at a center of the first electrode, and the shield electrode part of the second electrode is partially overlapped with the first electrode.

11. The liquid crystal display of claim 1,
wherein the common electrode part of the second electrode is substantially in parallel to the data line.

12. The liquid crystal display of claim 2,
wherein the spacer comprises a main spacer having a first height and a sub-spacer having a second height smaller than the first height.

13. The liquid crystal display of claim 12,
wherein the first substrate further comprises:
a second bump protruded from the first base substrate,
wherein the second substrate further comprises:
an overcoating layer including a first portion interposed between the main spacer and the first bump of the first substrate and a second portion interposed between the sub-spacer and the second bump of the first substrate, wherein the sub-spacer protrudes toward the second bump,
wherein the first portion of the overcoating layer is in direct contact with the first bump, and
wherein the second portion of the overcoating layer is spaced apart from the second bump.

* * * * *